United States Patent [19]

Okada et al.

[11] Patent Number: 5,543,462
[45] Date of Patent: Aug. 6, 1996

[54] IMPACT RESISTANT POLYSTYRENE COMPOSITION

[75] Inventors: Akihiko Okada; Nobuyuki Sato, both of Ichihara, Japan

[73] Assignee: Idemitsu Kosan Co., Ltd., Tokyo, Japan

[21] Appl. No.: 325,345

[22] PCT Filed: Mar. 2, 1994

[86] PCT No.: PCT/JP94/00332

§ 371 Date: Nov. 2, 1994

§ 102(e) Date: Nov. 2, 1994

[87] PCT Pub. No.: WO94/20571

PCT Pub. Date: Sep. 15, 1994

[30] Foreign Application Priority Data

Mar. 3, 1993 [JP] Japan ................... 5-042586

[51] Int. Cl.⁶ ............... C08L 25/10; C08L 83/04; C08L 81/04; C08L 75/04

[52] U.S. Cl. ............... 525/74; 525/70; 525/71; 525/73; 525/78; 525/80; 525/87; 525/91; 525/106; 525/114; 525/204; 525/207; 525/208; 525/212

[58] Field of Search ............... 525/87, 71, 70, 525/208, 132, 74, 73, 78, 80, 91, 106, 114, 130, 204, 207, 212

[56] References Cited

U.S. PATENT DOCUMENTS

| | | | |
|---|---|---|---|
| 4,780,509 | 10/1988 | Taubitz et al. | 525/282 |
| 4,886,856 | 12/1989 | Chen et al. | 525/74 |
| 5,001,194 | 3/1991 | Henton | 525/76 |
| 5,017,656 | 5/1991 | Bopp | 525/68 |
| 5,109,068 | 4/1992 | Yamasaki et al. | 525/68 |
| 5,164,479 | 1/1992 | Funaki et al. | 525/241 |
| 5,183,853 | 2/1993 | Guerra et al. | 525/132 |
| 5,183,871 | 2/1993 | Yamasaki | 525/241 |
| 5,223,576 | 6/1993 | Nakano et al. | 525/133 |
| 5,250,629 | 10/1993 | Tani et al. | 525/267 |
| 5,326,813 | 7/1994 | Okada et al. | |
| 5,352,727 | 10/1994 | Okada | |
| 5,436,397 | 7/1995 | Okada | 525/74 |

FOREIGN PATENT DOCUMENTS

| | | |
|---|---|---|
| 318793 | 6/1989 | European Pat. Off. |
| 508303 | 10/1992 | European Pat. Off. |
| 62-257950 | 11/1987 | Japan |
| 1-146944 | 6/1989 | Japan |
| 1-182344 | 7/1989 | Japan |
| 2-64140 | 3/1990 | Japan |

*Primary Examiner*—Veronica P. Hoke
*Attorney, Agent, or Firm*—Oblon, Spivak, McClelland, Maier & Neustadt, P.C.

[57] ABSTRACT

The present invention relates to an impact resistant polystyrene composition which comprises an (A) styrenic polymer having syndiotactic configuration and a (B) rubbery elastomer modified by a modifier having a polar group, or to an impact resistant polystyrene composition which comprises the aforesaid composition and a (C) rubbery elastomer and/or a (D) poly(phenylene ether).

The polystyrene compositions according to the present invention are excellent in heat resistance, modulus of elasticity, impact resistance and extensibility and thus are expected to find effective use for molding electric and electronic materials, industrial construction materials, automobile part, domestic electrical appliances, industrial materials such as various machine parts, etc.

10 Claims, No Drawings

IMPACT RESISTANT POLYSTYRENE COMPOSITION

TECHNICAL FIELD

The present invention relates to an impact resistant polystyrene composition. More particularly, it pertains to a syndiotactic polystyrene composition which is excellent not only in heat resistance and modulus of elasticity but also in impact resistance and extensibility.

BACKGROUND ART

A styrenic polymer having syndiotactic configuration (hereinafter sometimes abbreviated as SPS) is excellent in heat resistance and chemical resistance but is poor in impact resistance and therefore, it has heretofore been limited in the scope of application usable as a construction material. In order to solve the problem, improvement have been made on the impact resistance of SPS, for example, by blending a rubbery elastomer and/or other thermoplastic resin with SPS. (Refer to Japanese Patent Application Laid-Open Nos. 257950/1987, 146944/1989, 182344/1989, 279944/1989 and 64140/1990.)

For example, there are available SPS containing a styrenic compound as a component and as a rubbery elastomer (refer to Japanese Patent Application Laid-Open No. 146944/1989), a SPS/rubber composition incorporated with a block or graft copolymer containing atactic polystyrene chain as a compatibilizer (refer to Japanese Patent Application Laid-Open No. 279944/1989), and a SPS/rubber composition incorporated with a poly(phenylene ether) (refer to Japanese Patent Application Laid-Open No. 279944/1989) and the like.

However, since there is used in the above-mentioned improved technique, a rubbery component or a block or graft copolymer containing atactic polystyrene chain as a compatibilizer for the purpose of improving the compatibility between SPS and the rubbery component that are incompatible with each other and enhancing the dispersibility and interfacial strength of the rubbery component, the problem still remains unsolved in that the working effect as the compatibilizer and the enhancement of impact resistance have still been insufficient. On the other hand, in the case of adding a large amount of a poly(phenylene ether) for the purpose of enhancing the impact resistance, the addition thereof inevitably brings about the deterioration of the resultant composition with respect to the hue and long-term heat resistance as well as the decrease in the crystallinity of the SPS.

DISCLOSURE OF THE INVENTION

In view of the above, intensive research and investigation were continued by the present inventors in order to solve the above-mentioned problems. As a result, it has been found that such problems can be solved by incorporating a rubbery elastomer having a polar group as a rubber component alone or in combination with another rubbery elastomer into SPS. The present invention has been accomplished on the basis of the aforesaid finding and information.

That is to say, the present invention provides an impact resistant polystyrene composition which comprises 100 parts by weight of an (A) styrenic polymer having syndiotactic configuration and 1 to 100 parts by weight of a (B) rubbery elastomer having a polar group; and an impact resistant polystyrene composition which comprises 100 parts by weight of an (A) styrenic polymer having syndiotactic configuration, 1 to 100 parts by weight of a (B) rubbery elastomer having a polar group and 1 to 100 parts by weight of a (C) rubbery elastomer.

The present invention further provides an impact resistant polystyrene composition which comprises 100 parts by weight of an (A) styrenic polymer having syndiotactic configuration, 1 to 100 parts by weight of a (B) rubbery elastomer having a polar group and 0.1 to 5 parts by weight of a (D) poly(phenylene ether); and an impact resistant polystyrene composition which comprises 100 parts by weight of an (A) styrenic polymer having syndiotactic configuration, 1 to 100 parts by weight of a (B) rubbery elastomer having a polar group, 1 to 100 parts by weight of a (C) rubbery elastomer and 0.1 to 5 parts by weight of a (D) poly(phenylene ether).

THE MOST PREFERRED EMBODIMENT TO CARRY OUT THE INVENTION

In the impact resistant polystyrene composition according to the present invention, a styrenic polymer having syndiotactic configuration which constitutes the component (A) is employed as the matrix.

Here, the syndiotactic configuration in the styrenic polymer which has syndiotactic configuration means that its stereochemical structure is of syndiotactic configuration, i.e., the stereostructure in which phenyl groups or substituted phenyl groups as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. The styrenic polymers having such syndiotactic configuration as mentioned in the present invention usually means polystyrene, poly(alkylstyrene), poly(halogenareal styrene), poly(halogenated alkylstyrene), poly(alkoxystyrene), poly(vinyl benzoate), hydrogenated polymer thereof, the mixture thereof, and copolymers containing the above polymers as main components, having such a syndiotacticity as determined by the above-mentioned method that the proportion of racemic diad is at least 75%, preferably at least 85%, or the proportion of racemic pentad is at least 30%, preferably at least 50%. The poly(alkylstyrene) includes poly(methylstyrene), poly(ethylstyrene), poly(isopropylstyrene), poly(tert-butylstyrene), poly(phenylstyrene), poly(vinylnaphthalene) and poly(vinylstyrene). Poly(halogenated styrene) includes poly(chlorostyrene), poly(bromostyrene), and poly(fluorostyrene). Poly(halogenated alkylstyrene) includes poly(chloromethylstyrene). Poly(alkoxystyrene) includes poly(methoxystyrene), and poly(ethoxystyrene).

The particularly desirable styrenic polymers are polystyrene, poly(plmethylstyrene), poly(m-methylstyrene), poly(p-tert-butylstyrene), poly(p-chlorostyrene), poly(m-chlorostyrene), poly(p-fluorostyrene), hydrogenated polystyrene and the copolymer containing the structural units thereof.

The above-mentioned styrenic polymer may be used alone or in combination with at least one other one.

The molecular weight of the styrenic polymer to be used in the present invention is not specifically limited, but is desirably 10,000 or more, more desirably 50,000 or more in terms of weight-average molecular weight. The molecular-weight distribution, that is, the broadening of molecular weight of the styrenic polymer is not specifically limited as well, but may be in a wide range. A weight-average molecular weight of less than 10,000 is unfavorable since the composition or molding obtained therefrom is sometimes deteriorated thereby in the thermal and mechanical properties.

The styrenic polymer having such syndiotactic configuration can be produced by polymerizing a styrenic monomer which corresponds to the above styrenic polymer in the presence or absence of a solvent such as an inert hydrocarbon by the use of a catalyst comprising a titanium compound and a condensation product of water and trialkylaluminum (Japanese Patent Application Laid-Open No. 187708/1987). In addition, the poly(halogenated alkylstyrene) and the hydrogenated product thereof can be produced by the processes described in Japanese Patent Application Laid-Open Nos. 46912/1989 and 178505/1989, respectively.

In the polystyrene composition according to the present invention, there is used a rubbery elastomer having a polar group as the component (B) for the purpose of improving the impact resistance of the composition. A variety of such rubbery elastomers may be employed and exemplified by modified rubbers obtained by modifying with a modifying agent having a polar group, a copolymer rubber of ethylene and a polar vinyl monomer such as polysulfide rubber, thiokol rubber, acrylic rubber, urethane rubber, epichlorohydrin rubber, chlorinated rubber, styrene/butylacrylate rubber, ethylene/methyl methacrylate/glycidyl methacrylate copolymer rubber, and ethylene/methyl methacrylate/maleic anhydride copolymer rubber; natural rubber; polybutadiene; polyisoprene; polyisobutyrene; neoprene; silicone rubber; styrene/butadiene block copolymer (SBR); a styrene/butadiene/styrene block copolymer (SBS); hydrogenated styrene/butadiene/styrene block copolymer (SEBS); styrene/isoprene block copolymer (SIR); styrene/isoprene/styrene block copolymer (SIS); hydrogenated styrene/isoprene/styrene block copolymer (SEPS); ethylene/propylene rubber (EPM); ethylene/propylene/diene rubber (EPDM); and ethylene/butyrene rubber (EBM). Preferable rubbery elastomers having a polar group among these are those obtained by modifying SEBS, SBR, SBS, SEPS and SIS, respectively.

The above-exemplified rubbery elastomer having a polar group may be used alone or in combination with at least one other one.

The polar group is not specifically limited but is exemplified by acid halide, carbonyl group, acid anhydride, acid amide, carbonic acid ester, acid azide, sulfone group, nitrile group, cyano group, isocyanic acid ester group, amino group, hydroxyl group, imide group, thiol group, oxazoline group and epoxy group, of which an acid anhydride is particularly desirable, among which maleic anhydride group and epoxy group are most desirable. The content of the polar group is preferably 0.01% or more by weight based on the rubbery elastomer having a polar group as the component (B).

A content thereof less than 0.01% by weight sometimes makes it impossible to expect the improvement in mechanical strength.

As the component (B) of the present invention, SEBS which has a maleic anhydride group and an epoxy group is preferably employed in particular.

The rubbery elastomer which constitutes the component (C) is used for the purpose same as that of the above-mentioned component (B) and is exemplified by an ethylene/polar vinyl monomer copolymer-rubber such as polysulfide rubber, thiokol rubber, acrylic rubber, urethane rubber, epichlorohydrin rubber, chlorinated rubber, styrene/butylacrylate rubber, ethylene/methyl methacrylate/glycidyl methacrylate copolymer rubber, and ethylene/methyl methacrylate/maleic anhydride copolymer rubber; natural rubber; polybutadiene; polyisoprene; polyisobutyrene; neoprene; silicone rubber; styrene/butadiene block copolymer (SBR); a styrene/butadiene/styrene block copolymer (SBS); hydrogenated styrene/butadiene/styrene block copolymer (SEBS); styrene/isoprene block copolymer (SIR); styrene/isoprene/styrene block copolymer (SIS); hydrogenated styrene/isoprene/styrene block copolymer (SEPS); ethylene/propylene rubber (EPM); ethylene/propylene/diene rubber (EPDM); and ethylene/butyrene rubber (EBM) and a rubber obtained by modifying any of the above-exemplified rubbers. Of these are preferable SEBS, SBR and SBS, among which SEBS is particularly preferable.

The aforesaid rubbery elastomer may be used alone or in combination with at least one other one.

The poly(phenylene ether) as the component (C) is a publicly known compound, and reference may be made to U.S. Pat. Nos. 3,306,874, 3,306,875, 3,257,357 and 3,257,358.

The poly(phenylene ether) is prepared usually by oxidative coupling reaction forming a homopolymer or a copolymer in the presence of a cupramine complex and at least one di- or tri-substituted phenol. As the cupramine complex there may be used the cupramine complex derived from any of primary, secondary and tertiary amines.

Specific examples of the suitable poly(phenylene ether) include poly(2,3-dimethyl-6-ethyl-1,4-phenylene ether), poly(2-methyl-6-chloromethyl-1,4-phenylene ether), poly(2-methyl-6-hydroxyethyl-1,4-phenylene ether), poly(2-methyl-6-n-butyl-1,4-phenylene ether), poly(2-ethyl-6-isopropyl-1,4-phenylene ether), poly(2-ethyl-6-n-propyl-1,4-phenylene ether), poly(2,3,6-trimethyl-1,4-phenylene ether), poly[2-(4'-methylphenyl)1,4-phenylene ether], poly(2-bromo-6-phenyl-1,4-phenylene ether), poly(2-methyl-6-phenyl-1,4-phenylene ether), poly(2-phenyl-1,4-phenylene ether), poly(2-chloro-1,4-phenylene ether), poly(2-methyl-1,4-phenylene ether), poly(2-chloro-6-ethyl-1,4-phenylene ether), poly(2-chloro-6-bromo-1,4-phenylene ether), poly(2,6-di-n-propyl-1,4-phenylene ether), poly(2-methyl-6-isopropyl-1,4-phenylene ether), poly(2-chloro-6-methyl-1,4-phenylene ether), poly(2-methyl-6-ethyl-1,4-phenylene ether), poly(2,6-dibromo-1,4-phenylene ether), poly(2,6-dichloro-1,4-phenylene ether), poly(2,6-diethyl-1,4-phenylene ether) and poly(2,6-dimethyl-1,4-phenylene ether). Among the above-mentioned poly(phenylene ether), poly(2,6-dimethyl-1,4-phenylene ether) is particularly desirable for use.

The above-mentioned poly(phenylene ether) may be used alone or in combination with at least one other one.

The impact resistant polystyrene composition according to the present invention (hereinafter sometimes abbreviated as "the present composition") comprises the aforestated components (A) to (D) in combination.

In the case where the present composition is composed of the components (A) and (B), it comprises 100 parts by weight of the component (A) and 1 to 100, preferably 5 to 80 parts by weight of the component (B). An amount of the component (B) less than one (1) part by weight results in insufficient effect on the improvement of the impact resistance, whereas that more than 100 parts by weight brings about remarkable decrease in the modulus of elasticity and heat resistance of the present composition.

In the case where the present composition is composed of the components (A), (B) and (C), it comprises 100 parts by weight of the component (A), 1 to 100, preferably 5 to 80 parts by weight of the component (B) and 1 to 100, preferably 5 to 80 parts by weight of the component (C). In this case, an amount of the component (B) or (C) less than one (1) part by weight results in insufficient effect on the improvement of the impact resistance of the present composition, whereas that more than 100 parts by weight gives rise to remarkable decrease in the modulus of elasticity and heat resistance of the present composition. In addition, the amount of the component (B) is preferably 1 to 50% by weight of the total sum of the components (B) and (C). An amount of the component (B) less than 1% by weight leads to insufficient effect on the improvement of the impact strength and elongation, whereas that more than 50% by weight is unfavorable from the economical point of view. There are preferably used the components (B) and (C) each having the same skeleton or having high compatibility with each other.

In the case where the present composition is composed of the components (A), (B) and (D) or the components (A), (B), (C) and (D), the amount of the component (D) is 0.1 to 5 parts by weight based on 100 parts by weight of the component (A). An amount of the component (D) less than 0.1 part by weight results in insufficient effect on the improvement of the impact resistance of the present composition, while that more than 5 parts by weight leads to poor moldability of the present composition.

The composition according to the present invention may be incorporated as necessary with an additive such as an inorganic filler, a nucleating agent, an antioxidant, a ultraviolet absorber, an external lubricant, a plasticizer, an antistatic agent, a colorant, a flame retardant and a flame retardant aid or another thermoplastic resin insofar as the object of the present invention is not impaired.

As the inorganic filler, mention may be made of various fillers such as fibrous filler, granular filler and powdery filler. Examples of fibrous filler include glass fiber, carbon fiber, whisker, Kevlar fiber, ceramics fiber and metallic fiber. Specific examples of the filler include boron; alumina; silica; and silicon carbide as whisker, gypsum; potassium titanate; magnesium sulfate; and magnesium oxide as ceramics fiber, copper; aluminum; and steel as metallic fiber. The form or shape of the filler includes cloth, mat, bound and cut fiber, short fiber, filament and whisker. The bound and cut fiber has preferably a length of 0.05 to 50 mm and a diameter of 5 to 20 μm. The cloth fiber and mat fiber have preferably a length of at least one (1) mm, particularly at least 5 mm.

Examples of granular or powdery filler include talc, carbon black, graphite, titanium dioxide, silica, mica, calcium carbonate, calcium sulfate, barium carbonate, magnesium carbonate, magnesium sulfate, barium sulfate, oxysulfate, tin oxide, alumina, kaolin, silicon carbide, metallic powder, glass powder, glass flake and glass bead. Among the above-mentioned fillers are preferable in particular the glass fillers such as glass filament, glass fiber, glass roving, glass mat, glass powder, glass flake and glass beads.

The above-mentioned inorganic filler is preferably surface-treated. The purpose of use of the coupling agent to be used for the surface treatment is to improve the adhesivity between the filler and the resin component. The coupling agent may optionally be selected for use from the publicly known silane-based coupling agent and titanium-based coupling agent. Examples of the silane-based coupling agent include triethoxysilane, vinyltris(β-methoxyethoxy)silane, γ-methacryloxypropyl-trimethoxysilane, γ-glycidoxypropyl-trimethoxysilane, β-(1,1-epoxycyclohexyl)ethyl-trimethoxysilane, n-β-(aminoethyl)-γ-aminopropyl-trimethoxysilane, N-β-(aminoethyl)-γ-aminopropyl-methyldimethoxysilane, γ-aminopropyl-triethoxysilane, N-phenyl-γ-aminopropyl-trimethoxysilane, γ-mercaptopropyl-trimethoxysilane, γ-chloropropyl-trimethoxysilane, γ-aminopropyl-trimethoxysilane, γ-aminopropyl-tris(2-methoxyethoxy)silane, N-methyl-γ-aminopropyl-trimethoxysilane, N-vinylbenzyl-γ-aminopropyl-triethoxysilane, triaminopropyl-trimethoxysilane, 3-ureidopropyl-trimethoxysilane, 3-(4,5-dihydroimidazole)propyl-triethoxysilane, hexamethyldisilazane, N,O-(bistrimethylsilyl)amide and N,N-bis(trimethylsilyl)urea. Among them are desirable aminosilane and epoxysilane such as γ-aminopropyltriethoxysilane, N-β-(aminoethyl)-γ-aminopropyltriethoxysilane, γ-glicidoxypropyltrimethoxysilane, β-(3,4-epoxycyclohexyl)ethyltrimethoxysilane.

Specific examples of the titanium-based coupling agent include isopropyltriisostearoyl titanate, isopropyltridodecylbenzenesulfonyl titanate, isopropyltris(dioctylpyrophosphate)titanate, tetraisopropylbis(dioctylphosphite)titanate, tetraoctylbis(di-tridecylphosphite)titanate, tetra(1,1-diallyloxymethyl-1-butyl)bis(ditridecyl)phosphite titanate, bis-(dioctylpyrophosphate)oxyacetate titanate, bis(dioctylpyrophosphate)ethylene titanate, isopropyltrioctanoyl titanate, isopropyldimethacrylisostearoyl titanate, isopropylisostearoyldiacrylate titanate, isopropyltri(dioctylphosphate)titanate, isopropyltricumylphenyl titanate, isopropyltri(N-amidoethyl-aminoethyl)citanate, dicumylphenyloxyacetate titanate and di-isostearoyl-ethylene titanate, among which isopropyltri(N-amidoethyl-aminoethyl) titanate is desirable.

The surface treatment of the above-mentioned filler by the use of such coupling agent can be effected by a conventional known method without specific limitation, for example, sizing treatment in which the filler is coated with the sizing agent in the form of solution of the coupling agent as mentioned above in an organic solvent or in the form of suspension containing the coupling agent; dry blending by the use of a Henschel mixer, super mixer, Ready-gel mixer, V-type blender or the like; spraying method; integral blending; dry concentration or the like, each being suitably selected according to the form and shape of the filler to be used. The surface treatment is, however, preferably carried out by means of sizing treatment, dry blending, spraying or the like.

In combination with the aforementioned coupling agent, a film forming substance for glass may be used without specific limitation and is exemplified by the polymer such as polyester-based, urethane-based, epoxy-based, acrylics-based, vinyl acetate-based and isocyanate-based polymers.

Examples of the nucleating agent include a metallic salt of an organic acid and an organic phosphorus compound, of which are preferable an aluminum salt of di-P-tert-butylbenzoic acid, an aluminum salt of p-(tert-butyl)benzoic acid, a sodium salt of cyclohexanecarboxylic acid and a sodium salt of β-naphthoic acid.

Among the organic phosphorus compounds is preferable sodium phosphate of methylenebis(2,4-di-tert-butylphenol) acid.

The nucleating agent may be used alone or in combination with at least one other one.

Examples of the usable antioxidant include (2,6-di-tert-butyl-4-methylphenyl)pentaerythritol diphosphate (produced by Adeka Argus Co., Ltd. under the trademark "PEP-36") and tetrakis[methylene-3-(3',5'-di-tert-butyl-4'-hydroxyphenyl)]propionate (produced by Adeka Argus Co., Ltd. under the trademark "MARK A060").

The antioxidant may be used alone or in combination with at least one other one.

The present composition is prepared by compounding and blending the aforesaid components (A) and (B) or components (A), (B) and any one of the components (C) and (D) and, as required, another additive and/or another thermoplastic resin.

As a method of blending, there may be optionally adoptable melt kneading method, solution blending method and the like method, each being a conventional known method. As a method of blending the inorganic filler which has been treated with the coupling agent, there may be adoptable, in addition to the aforesaid methods, a method in which a sheet composed of the component (A) or a composition containing the same is laminated with glass mat, followed by melting, a method in which the component (A) or a composition containing the same and a long fiber type inorganic filler are mixed in a liquid to form a slurry, followed by precipitation and heating and the like method. In general, ordinary melt kneading by means of a Banbury mixer, Henschel mixer, kneading roll or the like is preferable.

In the following, the present invention will be described in more detail with reference to preparation examples, examples and comparative examples.

PREPARATION EXAMPLE 1

SEBS (produced by Shell Chem. Co. under the trademark "Kraton G-1651") in an amount of 1000 g was dry-blended and melt kneaded along with 30 g of maleic anhydride by the use of a 30 mm twin-screw extruder at a revolution of 200 rpm at a temperature set to 300° C. to produce maleic anhydride-modified SEBS. In order to measure the modification rate of the resultant maleic anhydride-modified SEBS, it was dissolved in chloroform and then reprecipitated in methanol, and the recovered polymer was subjected to Soxhlet extraction using methanol and dried. Thereafter the modification rate was determined from the intensity of carbonyl absorption in infrared (IR) absorption spectrum as well as by titration. As a result, the modification rate of the maleic anhydride-modified SEBS was 0.8% by weight.

EXAMPLE 1

To 1000 g of SPS (weight-average molecular weight of 360,000, weight-average molecular weight/number-average molecular weight ratio of 2.40) were added 250 g of maleic anhydride-modified SEBS which had been obtained in the Preparation Example 1, 10 g of p-(tert-butyl)aluminum benzoate (produced by Dainippon Ink & Chemicals, Inc. under the trademark "PTBBA-A1) as a nucleating agent, 1 g of (2,6-di-tert-4-methylphenyl)pentaerythritol diphosphite (produced by Adeka Argus Co., Ltd. under the trademark "PEP-36") as an antioxidant and 1 g of tetrakis[methylene-3-(3',5'-di-tert-butyl-4'-hydroxyphenyl)]propionate (produced by Adeka Argus Co., Ltd. under the trademark "A060") also as an antioxidant, and the resultant mixture was dry blended with a Henschel mixer. Subsequently, the blend was pelletized with a twin-screw extruder.

The pellet thus obtained was injection molded to produce test pieces for Izod impact test, flexural test and tensile test, respectively. Thus measurements were made of Izod impact strength, extensibility, modulus of elasticity and heat distortion temperature by using the respective test pieces thus obtained. The results obtained are given in Table 1.

EXAMPLE 2

To 1000 g of SPS (weight-average molecular weight of 360,000, weight-average molecular weight/number-average molecular weight ratio of 2.40) were added 20 g of maleic anhydride-modified SEBS which had a polar group (produced by Asahi Chemical Industry Co., Ltd. under the trademark "M-1913"), 230 g of SEBS (produced by Shell Chem. Co. under the trademark "Kraton G-1651") as a rubbery elastomer, 10 g of p-(tert-butyl)aluminum benzoate (produced by Dainippon Ink & Chemicals, Inc. under the trademark "PTBBA-A1) as a nucleating agent, 1 g of (2,6-di-tert-4-methylphenyl)pentaerythritol diphosphite (produced by Adeka Argus Co., Ltd. under the trademark "PEP-36") as an antioxidant and 1 g of tetrakis[methylene-3-(3',5'-di-tert-butyl-4'-hydroxyphenyl)]propionate (produced by Adeka Argus Co., Ltd. under the trademark "A060") also as an antioxidant, and the resultant mixture was dry blended with a Henschel mixer. Subsequently, the blend was pelletized with a twin-screw extruder.

The pellet thus obtained was injection molded to produce test pieces fore Izod impact test, flexural test and tensile test, respectively. Thus measurements were made of Izod impact strength, extensibility, modulus of elasticity and heat distortion temperature by using the respective test pieces thus obtained. The results obtained are given in Table 1.

EXAMPLES 3 TO 4

The procedure in Example 2 was repeated to produce test pieces and measure the properties except that the types and the amounts to be used of the rubbery elastomers having a polar group and the rubbery elastomers were altered as shown in Table 1. The results obtained are given in Table 1.

COMPARATIVE EXAMPLES 1 TO 2

The procedure in Example 2 was repeated to produce test pieces and measure the properties except that there were used rubbery elastomers having no polar group as shown in Table 1. The result obtained are given in Table 1.

TABLE 1

| | Component (A) | | Component (B) | | Component (C) | | Izod impact strength*A (kJ/m$^2$) | Elongation*B (%) |
|---|---|---|---|---|---|---|---|---|
| | Kind | Parts by weight | Kind | Parts by weight | Kind | Parts by weight | | |
| Example 1 | SPS | 100 | Preparation Example 1 | 25 | — | — | 10.8 | 17.3 |
| Example 2 | SPS | 100 | SEBS*1 | 2 | SEBS*4 | 23 | 11.5 | 20.5 |
| Example 3 | SPS | 100 | SEBS*2 | 2 | SEBS*4 | 23 | 10.9 | 20.0 |

TABLE 1-continued

|  | Component (A) | | Component (B) | | Component (C) | | Izod impact strength*A (kJ/m²) | Elongation*B (%) |
| --- | --- | --- | --- | --- | --- | --- | --- | --- |
|  | Kind | Parts by weight | Kind | Parts by weight | Kind | Parts by weight |  |  |
| Example 4 | SPS | 100 | EPM*3 | 2 | EPM*5 | 23 | 6.8 | 9.5 |
| Comparative Example 1 | SPS | 100 | — | — | SEBS*4 | 25 | 5.2 | 11.1 |
| Comparative Example 2 | SPS | 100 | — | — | EPM*5 | 25 | 3.9 | 6.9 |

EXAMPLE 5

To 1000 g of SPS (weight-average molecular weight of 360,000, weight-average molecular weight/number-average molecular weight ratio of 2.40) were added 250 g of maleic anhydride-modified SEBS which had been obtained in the Preparation Example 1, 20 g of poly(2,6-dimethyl-1,4-phenylene ether), 10 g of p-(tert-butyl)aluminum benzoate (produced by Dainippon Ink & Chemicals, Inc. under the trademark "PTBBA-A1) as a nucleating agent, 1 g of (2,6-di-tert-4-methylphenyl)pentaerythritol diphosphite (produced by Adeka Argus Co., Ltd. under the trademark "PEP-36") as an antioxidant and 1 g of tetrakis[methylene-3-(3',5'-di-tert-butyl-4'-hydroxyphenyl)]propionate (produced by Adeka Argus Co., Ltd. under the trademark "A060") also as an antioxidant, and the resultant mixture was dry blended with a Henschel mixer. Subsequently, the blend was pelletized with a twin-screw extruder.

The pellet thus obtained was injection molded to produce test pieces for Izod impact test, flexural test and tensile test, respectively. Thus measurements were made of Izod impact strength, extensibility, modulus of elasticity and heat distortion temperature by using the respective test pieces thus obtained. The results obtained are given in Table 2.

EXAMPLE 6

To 1000 g of SPS (weight-average molecular weight of 305,000, weight-average molecular weight/number-average molecular weight ratio of 2.35) were added 20 g of maleic anhydride-modified SEBS which had a polar group (produced by Asahi Chemical Industry Co., Ltd. under the trademark "M-1913"), 230 g of SEBS (produced by Shell Chem. Co. under the trademark "Kraton G-1651") as a rubbery elastomer, 20 g of poly(2,6-dimethyl-1,4-phenylene ether), 10 g of p-(tert-butyl)aluminum benzoate (produced by Dainippon Ink & Chemicals, Inc. under the trademark "PTBBA-A1) as a nucleating agent, 1 g of (2,6-di-tert-4-methylphenyl)pentaerythritol diphosphite (produced by Adeka Argus Co., Ltd. under the trademark "PEP-36") as an antioxidant and 1 g of tetrakis[methylene-3-(3',5'-di-tert-butyl-4'-hydroxyphenyl)]propionate (produced by Adeka Argus Co., Ltd. under the trademark "A060") also as an antioxidant, and the resultant mixture was dry blended with a Henschel mixer. Subsequently, the blend was pelletized with a twin-screw extruder.

The pellet thus obtained was injection molded to produce test pieces for Izod impact test, flexural test and tensile test, respectively. Thus measurements were made of Izod impact strength, extensibility, modulus of elasticity and heat distortion temperature by using the respective test pieces thus obtained. The results obtained are given in Table 2.

EXAMPLES 7 TO 9

The procedure in Example 6 was repeated to produce test pieces and measure the properties except that the types and the amounts to be used of the rubbery elastomers having a polar group and the rubbery elastomers were altered as shown in Table 2. The results obtained are given in Table 2.

COMPARATIVE EXAMPLES 3 TO 5

The procedure in Example 6 was repeated to produce test pieces and measure the properties except that there were used rubbery elastomers having no polar group as shown in Table 2. The result are given in Table 2.

TABLE 2

|  | Component (A) | | Component (B) | | Component (C) | |
| --- | --- | --- | --- | --- | --- | --- |
|  | Kind | Parts by weight | Kind | Parts by weight | Kind | Parts by weight |
| Example 5 | SPS | 100 | Preparation Example 1 | 25 | — | — |
| Example 6 | SPS | 100 | SEBS*1 | 2 | SEBS*4 | 23 |
| Example 7 | SPS | 100 | SEBS*2 | 2 | SEBS*4 | 23 |
| Example 8 | SPS | 100 | SEBS*1 | 2 | SEBS*4 | 23 |
| Example 9 | SPS | 100 | EPM*3 | 2 | EPM*5 | 23 |
| Comparative Example 3 | SPS | 100 | — | — | SEBS*4 | 25 |
| Comparative Example 4 | SPS | 100 | — | — | SEBS*4 | 25 |
| Comparative Example 5 | SPS | 100 | — | — | EPM*5 | 25 |

|  | Component D | | Izod impact strength*A (kJ/m²) | Elongation*B (%) |
| --- | --- | --- | --- | --- |
|  | Kind | Parts by weight | | |

TABLE 2-continued

| | | | | |
|---|---|---|---|---|
| Example 5 | Poly(phenylene ether)*6 | 2 | 13.0 | 19.4 |
| Example 6 | Poly(phenylene ether)*6 | 2 | 14.0 | 24.3 |
| Example 7 | Poly(phenylene ether)*6 | 2 | 13.5 | 23.8 |
| Example 8 | Poly(phenylene ether)*6 | 4 | 16.2 | 29.5 |
| Example 9 | Poly(phenylene ether)*6 | 2 | 8.5 | 12.0 |
| Comparative Example 3 | Poly(phenylene ether)*6 | 2 | 5.9 | 12.8 |
| Comparative Example 4 | Poly(phenylene ether)*6 | 4 | 6.4 | 14.5 |
| Comparative Example 5 | Poly(phenylene ether)*6 | 2 | 4.2 | 7.5 |

Remarks
*$^A$According to JIS K 7110 with notch
*$^B$According to JIS K 7113
*$^1$Maleic anhydride-modified SEBS (M-1913, produced by Asahi Chemical Industry Co., Ltd.)
*$^2$Glycidyl methacrylate-modified SEBS (Z-513, produced by Asahi Chemical Industry Co., Ltd.)
*$^3$Maleic anhydride-modified EPM (T-7711SP, produced by Japan Synthetic Rubber Co., Ltd.)
*$^4$SEBS (Kraton G-1651, produced by Shell Chem. Co.)
*$^5$EPM (EP-07P, produced by Japan Synthetic Rubber Co., Ltd.)
*$^6$Poly(2,6-dimethyl-1,4-phenylene ether)

INDUSTRIAL APPLICABILITY

The impact resistant polystyrene composition according to the present invention is excellent in impact resistance and extensibility and thus is expected to find effective use for molding electric and electronic materials such as connectors and print circuit boards; industrial construction materials; automobile parts such as connectors to be mounted on vehicles, wheel cap, cylinder and head cover; domestic electrical appliances; industrial materials such as various machine parts etc.

We claim:

1. An impact resistant polystyrene composition which comprises 100 paths by weight of an (A) styrenic polymer having syndiotactic configuration and 1 to 100 parts by weight of a (B) rubbery elastomer modified by a modifier having a polar group.

2. An impact resistant polystyrene composition which comprises 100 parts by weight of an (A) styrenic polymer having syndiotactic configuration, 1 to 100 parts by weight of a (B) rubbery elastomer modified by a modifier having a polar group and 1 to 100 parts by weight of a (C) rubbery elastomer.

3. An impact resistant polystyrene composition which comprises 100 parts by weight of an (A) styrenic polymer having syndiotactic configuration, 1 to 100 parts by weight of a (B) rubbery elastomer modified by a modifier having a polar group and 0.1 to 5 parts by weight of a (D) poly(phenylene ether).

4. An impact resistant polystyrene composition which comprises 100 parts by weight of an (A) styrenic polymer having syndiotactic configuration, 1 to 100 parts by weight of a (B) rubbery elastomer modified by a modifier having a polar group, 1 to 100 parts by weight of a (C) rubbery elastomer and 0.1 to 5 parts by weight of a (D) poly(phenylene ether).

5. The impact resistant polystyrene composition according to any one of claims 1 to 4 wherein the rubbery elastomer having a polar group as the component (B) is a rubbery elastomer modified by a modifier having a maleic anhydride group.

6. The impact resistant polystyrene composition according to any one of claims 1 to 4 wherein the rubbery elastomer modified by a modifier having a polar group as the component (B) is a rubbery elastomer having an epoxy group.

7. The impact resistant polystyrene composition according to any one of claims 1 to 4 wherein the rubbery elastomer modified by a modifier having a polar group as the component (B) is a hydrogenated styrene/butadiene/styrene copolymer rubber having an epoxy group.

8. The impact resistant polystyrene composition according to claim 2 wherein the rubbery elastomer as the component (C) is a hydrogenated styrene/butadiene/styrene copolymer rubber.

9. The impact resistant polystyrene composition according to claim 4 wherein the rubbery elastomer as the component (C) is a hydrogenated styrene/butadiene/styrene copolymer rubber.

10. The impact resistant polystyrene composition according to any one of claim 1 to 4, wherein said rubbery elastomer modified by a modifier is selected from the group consisting of SEBS, SBR and SBS, and mixtures thereof.

* * * * *